Figure 1:
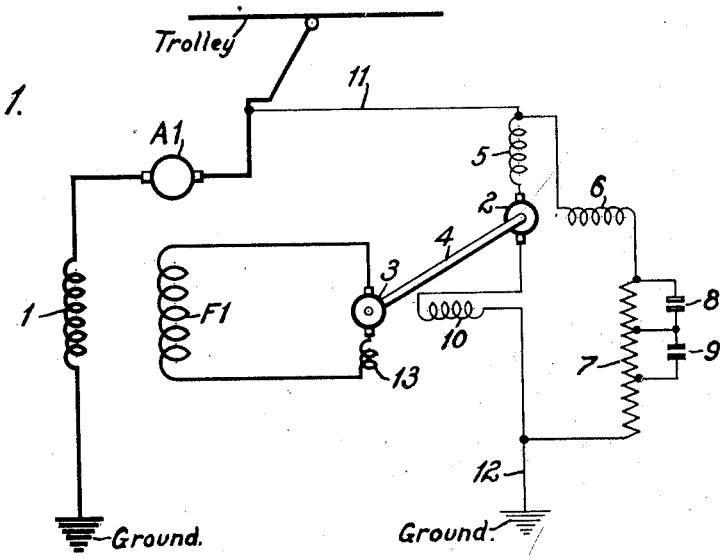

R. E. HELLMUND.
SYSTEM OF CONTROL.
APPLICATION FILED AUG. 30, 1916.

1,320,051.

Patented Oct. 28, 1919.

WITNESSES:
R. J. Fitzgerald
W. R. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,051.  Specification of Letters Patent.  Patented Oct. 28, 1919.

Application filed August 30, 1916. Serial No. 117,642.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Systems of Control, of which the following is a specification.

My invention relates to systems of control for electric railway motors and the like and especially to the regenerative control of direct-current motors of the class indicated.

In regenerative systems employing auxiliary sources of energy for the main-machine field windings, such as an exciting armature of a motor-generator set, the excitation of which is proportional to or dependent upon the supply-circuit voltage, in case of a sudden decrease thereof, the excitation of the motor-generator set and, consequently, indirectly of the main machine or machines, is correspondingly reduced. The inherent tendency to regenerate excessive currents under such conditions will not, therefore, last for any considerable length of time. However, since the main machine field winding is inherently of relatively high induction, and the field flux is damped by eddy currents in the frame, and since, therefore, the respective current and flux changes therein do not occur very rapidly, it follows that temporary overloads of the motor, with the resultant relatively high voltage upon the commutator cylinder, and, consequently, "flash-over" troubles may occur.

In my co-pending application, Serial No. 117,643, filed August 30, 1916, is shown and described means depending, more or less, upon actual changes in regenerated current for effecting relatively rapid variations of the main field-winding excitation that are more than proportionate to the corresponding changes of supply-circuit voltage, and the time element which the motor-generator set requires to adjust itself to the new conditions is subsequently utilized to reverse the over-compensating effect to such a degree that the resultant variation of main field-winding excitation is substantially proportionate to the supply-circuit voltage fluctuation in question.

The object of my present invention is to accomplish a similar function by means of the voltage or current changes in an exciting dynamotor or motor-generator set alone. In other words, the desired relatively rapid over-compensating effect and the subsequent neutralizing action is brought about by the inherent operation of the dynamotor or motor-generator set alone, without the aid of the external changes that are dependent upon the variation of regenerated current, as is the case in the above-mentioned co-pending application.

Figure 2:
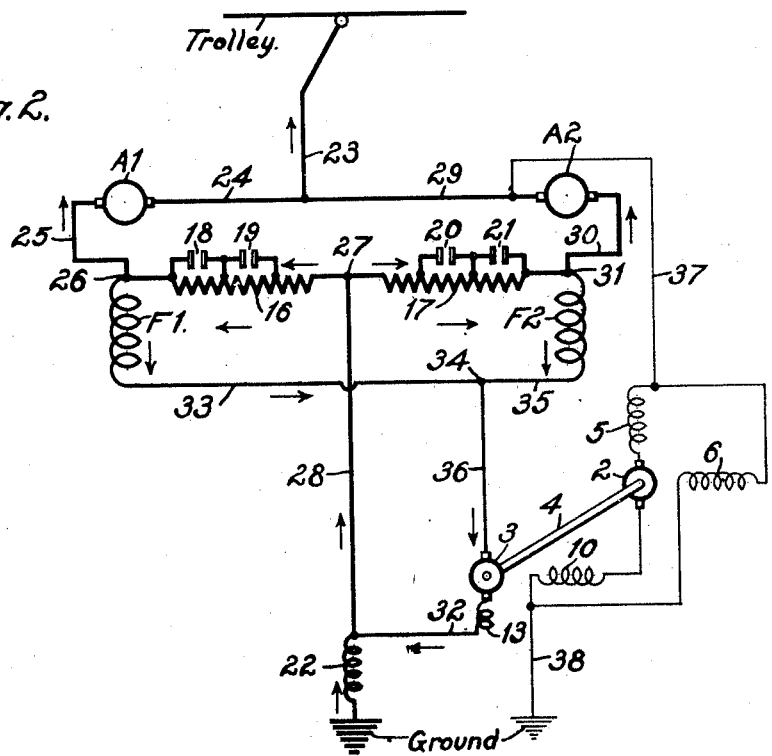

In the accompanying drawing, Figure 1 is a diagrammatic view of a system of control embodying my invention, and Fig. 2 is a similar view of a modification thereof.

Referring to Fig. 1 of the drawing, the system shown comprises a plurality of suitable supply-circuit conductors respectively marked "Trolley" and "Ground," a main dynamo-electric machine having an armature A1 and a field-magnet winding F1 of the well-known series type, an inductive device 1 that is connected in series-circuit relation with the main armature A1 for a purpose to be described, and an auxiliary motor-generator set or the like embodying a driving armature 2 and a driven armature 3 that may be mechanically coupled in any convenient manner, as by a shaft 4.

The auxiliary driving armature 2 is provided with a series-related field winding 5 and a shunt-connected field winding 6 that is disposed in series relation with a suitable resistor 7, which may be varied in any well-known manner, as by a plurality of switches 8 and 9.

The auxiliary driven or generating armature 3 is directly connected across the main field winding F1 to furnish the sole excitation therefor during the regenerating period. A field winding 10 for the generator armature winding 3 is connected in series relation with the auxiliary motor armature winding 2, as traced in detail later, and a series-related field winding 13 for the armature 3 is also preferably provided.

Inasmuch as the particular switching or controlling devices that are employed for making the various illustrated connections and for inaugurating regenerative operation are immaterial to my present invention, I have not deemed it necessary to illustrate any such devices. It will be understood that any suitable means for accomplishing the desired connections may be utilized, and I will describe the various systems only, in so far as is necessary to obtain a complete understanding of my present invention.

As previously stated, the main armature A1 is connected in series relation with the inductive device 1 across the supply circuit, while the main field winding F1 is separately excited from the auxiliary driving armature 3 during the regenerative period. An auxiliary circuit is completed from the Trolley through conductor 11, series field winding 5 and armature winding 2 of the auxiliary driving motor, field winding 10 for the auxiliary generator armature 3 and conductor 12 to the negative supply-circuit conductor Ground. The shunt field winding 6 and the variable resistor 7 are connected in series relation between the conductors 11 and 12, or, in other words, the shunt field winding 6 is excited directly from the supply circuit.

Assuming that the various circuit connections are as illustrated, and that regenerative operation is being effected, in case of a sudden reduction of supply-circuit voltage, the operation of the system is as follows: The damping or choke coil effect of the shunt-connected field winding 6 for the auxiliary driving armature 2 will momentarily maintain the field excitation of the driving armature 2 substantially constant, so that the speed of the motor-generator set does not change for a short period of time. Consequently, the counter-electro-motive force of the driving armature 2 may either equal or exceed the reduced supply-circuit voltage that is impressed upon the driving armature, in accordance with the particular design and operating characteristics of the motor-generator set.

As a result, a sudden and material decrease or possible momentary reversal of the current in the driving armature winding 2 and the series-related field winding 10 for the driven armature 3 will occur. If the exciting armature 3 and the field winding 10 therefor are provided with laminated field-magnet structures or core members, then the excitation and generated voltage of the exciting armature will very quickly follow the above-mentioned circuit changes and thus cause a relatively rapid variation of the current traversing the main field winding F1 and, therefore, a corresponding variation, in this case a reduction, of the main regenerated voltage, whereby the current returned to the supply circuit is maintained substantially constant.

The motor-generator set, as previously mentioned, is adapted to vary the main field-winding excitation more than proportionately to the concurrent supply-circuit voltage reduction and then the various operating members of the motor-generator set adjust themselves to the new voltage conditions after a relatively short, but appreciable, time interval, and thus slightly increase the main field-winding excitation until conditions are properly balanced throughout the system.

As will be understood, the reversed effect of an automatic increase of main field-winding current to insure the maintenance of substantially constant regenerated current, will be produced upon a sudden increase of the supply-circuit voltage.

During the above-mentioned operation, the inductive device 1 that is connected in series relation with the main armature A1 will also tend to prevent any sudden and undesirable increase of regenerative current, as a further safe-guard against the above-mentioned "flash-over" conditions.

The auxiliary driving motor armature 2, although provided with the shunt-connected field widing 6 and, therefore, having a certain inherent tendency toward sluggish field-excitation changes and consequent "flash-over" conditions, is also provided with the series field-winding 5 to suitably compensate for, or counteract, this tendency by reason of its relatively rapid variation of excitation in accordance with the supply-circuit voltage fluctuations. The series field-winding 5 thus aids the desired sudden changes by reducing the effective self-induction of the auxiliary motor. A similar remark applies to the series field-winding 13 for the armature 3, when such field winding is employed.

Referring to Fig. 2, the system shown comprises the supply-circuit conductors Trolley and Ground and the auxiliary motor-generator set, substantially as illustrated in Fig. 1; a plurality of parallel-related main dynamo-electric machines respectively having armatures A1 and A2 and field windings F1 and F2; a plurality of variable resistors 16 and 17 that are disposed in series-circuit relation with the respective main armatures; and a main-circuit inductive device 22.

The resistor 7 that is employed in the system of Fig. 1 is omitted from Fig 2 but, otherwise, the motor-generator set connections are identical with those illustrated in the first figure.

Assuming that the circuit connections are as illustrated and that regenerative operation has been begun in any suitable manner, the various circuit connections may be traced as follows: The main circuit is established from the Trolley through conductors 23, where the circuit divides, one branch including conductor 24, main armature A1, conductor 25, junction-point 26, and main-circuit resistor 16 which may be gradually short-circuited, as the machine speed decreases, by means of suitable switches 18 and 19 to junction-point 27, and the other branch including conductor 29, main armature A2, conductor 30, junction-point 31, main-circuit resistor 17 certain sections of which may be short-circuited through the agency of suitable switches 20 and 21, to the junction-point 27, whence a common circuit is completed through conductor 28 and the inductive device 22 to the negative conductor Ground.

The circuit of the exciting armature winding 3 is established from one terminal thereof through conductors 32 and 28 to the junction-point 27, where the circuit divides, one branch including the variable main-circuit resistor 16, main field winding F1 and conductor 33 to a junction-point 34, and the other branch including the variable main-circuit resistor 17, the main field winding F2 and conductor 35 to the junction-point 34, whence a common circuit is completed through conductor 36 to the other terminal of the exciting armature 3.

A further auxiliary circuit is completed from the positively-energized conductor 29 through conductor 37, the series field-winding 5 and the armature winding 2 of the auxiliary driving motor, the field winding 10 for the auxiliary exciting armature 3 and conductor 38 to the negative conductor Ground.

As indicated by the various arrows, the main regenerated current and the auxiliary exciting current from the armature 3 traverse each of the main-circuit resistors 16 and 17 in the same direction. Consequently, upon a sudden increase of regenerated current, the voltage drop across the corresponding main-circuit resistor is accordingly increased, and the voltage impressed upon the corresponding main field-winding from the exciting armature 3 is reduced in the same proportion. Thus, the excitation of the corresponding main machine is reduced to maintain a substantially constant regenerated current. The converse action takes place when the regenerated current in either main machine armature tends to decrease. The system just outlined is fully set forth and claimed in a co-pending application of R. E. Hellmund, Serial No. 44,443, filed August 9, 1915.

The values of the main-circuit resistors 16 and 17 are so selected that the increase and decrease of the main field-winding excitation in accordance with the regulating operation just recited, is more than proportional to the corresponding increase or decrease of regenerated current, which in turn usually corresponds to a certain decrease or increase, respectively, of the supply-circuit voltage. Moreover, the motor-generator set will, in general, act in the same manner as explained in connection with Fig. 1, upon a sudden rise or fall of supply-circuit voltage, to further accentuate the above-mentioned action of the main-circuit resistors 16 and 17.

Furthermore, the decrease of current traversing the exciting armature winding 3 by reason of the corresponding action of the main-circuit resistors entails a corresponding reduction of the current traversing the auxiliary driving armature 2 and the field winding 10 for the exciting armature 3, whereby the main field-winding excitation may be still further varied.

The system illustrated in Fig. 2, therefore, adds certain inherent regulating features to the system that is shown in Fig. 1 to vary the main field-winding excitation more than proportionately to the corresponding supply-circuit voltage fluctuation. After a short time interval, the motor-generator set again adjusts itself to the new voltage conditions to slightly increase or decrease the main field-winding excitation, as the case may be, to substantially exactly compensate for the supply-circuit voltage fluctuation in question. The main-circuit inductive device 22 is adapted to perform a current-surge-preventing function similar to the previously-described action of the inductive device 1 that is shown in Fig. 1, as will be understood.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a control system, the combination with a supply circuit and a dynamo-electric machine driven therefrom and having an armature and a field winding, of an auxiliary source of current connected to said field winding and operated from said supply circuit, and means electrically associated with said source and dependent only upon sudden changes of supply-circuit voltage for effecting a certain disproportionate variation of the field-winding excitation.

2. In a control system, the combination with a supply circuit and a dynamo-electric machine having an armature and a field winding, of an auxiliary driven armature for supplying energy to said field winding, an auxiliary driving armature having a shunt-excited field winding, and a single exciting winding for said driven armature connected in series relation with said driving armature, whereby a sudden change of supply-circuit voltage produces a relatively rapid and more than proportionate change of main field-winding excitation.

3. In a control system, the combination with a supply circuit and a dynamo-electric machine having an armature and a field winding, of auxiliary dynamo-electric means driven from the supply circuit and comprising a motor-generator set having the single exciting field winding of the generator connected in series with the motor armature and having a shunt-excited field winding for that armature, said means being thereby dependent only upon changes in the driving current caused by supply-circuit voltage fluctuations for effecting a certain variation of the main field-winding excitation disproportionate to such fluctuations.

4. In a control system, the combination with a supply circuit and a dynamo-electric machine having an armature and a field winding, of an auxiliary driven armature for supplying energy to said field winding, an auxiliary driving armature fed from the supply circuit and having a shunt-excited field winding, and a field winding connected in series with said driving armature for alone exciting the driven armature, whereby sudden changes of supply-circuit voltage act in conjunction with the armatures in producing a change of main field-winding excitation more than proportionate to such voltage changes.

5. In a control system, the combination with a supply circuit and a dynamo-electric machine having an armature and a field winding, of an auxiliary generating armature for supplying energy to said field winding, an auxiliary motor armature fed from the supply circuit for driving said generating armature, a plurality of field windings for said auxiliary armatures connected in series relation with one of them, and another auxiliary field winding connected in shunt relation to one of the auxiliary armatures, whereby, upon sudden changes of supply-circuit voltage, the auxiliary field windings act in conjunction with their armatures to produce a relatively rapid and more than proportionate change of main field-winding excitation and a more slowly-acting reversed effect to subsequently render the change of main field-winding excitation substantially proportional to the corresponding change of supply-circuit voltage.

6. In a system of control, the combination with a supply circuit and a dynamo-electric machine having an armature and a field winding, of an auxiliary driven armature winding for exciting said field winding, an auxiliary driving armature winding provided with a series-related and a shunt-connected field winding, a field winding for said driven armature connected in series relation with said driving armature, and an inductive device connected in circuit with the main armature.

7. In a system of control, the combination with a supply circuit and a dynamo-electric machine having an armature and a field winding, of a resistor connected in series relation to the main armature and in parallel relation to the main field windings, and auxiliary driven armature for energizing said field winding and said resistor, an auxiliary driving armature winding provided with a series-related and a shunt-connected field winding, a field winding for said driven armature connected in series relation with said driving armature, and an inductive device connected in circuit with the main armature.

8. In a control system, the combination with a supply circuit and a main dynamo-electric machine having an armature and a field winding, of means comprising a motor-generator set for supplying energy to the main field winding, the generator of said set being provided with a field winding disposed in series-circuit relation with the motor armature, and the motor field winding being disposed in shunt-circuit relation with the circuit comprising the motor armature and the generator field winding in order that sudden changes of supply-circuit voltage may effect a certain disproportionate variation of the main-field-winding excitation.

9. In a control system, the combination with a supply circuit and a momentum-driven dynamo-electric machine having an armature and a series-type field winding, of an auxiliary motor-generator set driven from the supply circuit for exciting the main field winding during regeneration, the single exciting field winding of the auxiliary generator being connected in circuit with the auxiliary motor armature in order to effect, upon a change of supply-circuit voltage, a variation of the main-field-winding excitation disproportionate to such change.

10. In a control system, the combination with a distribution circuit and a dynamo-electric machine having an armature and a field winding, of an auxiliary driven armature for supplying energy to said field winding, an auxiliary driving armature, and field-exciting means for said auxiliary armatures adapted to temporarily regulate the main-field-winding excitation in accordance with the difference between the distribution-voltage fluctuations and a slowly-changing counter-voltage in the auxiliary machines.

11. In a control system, the combination with a distribution circuit and a dynamo-electric machine having an armature and a field winding, of an auxiliary driven armature for supplying energy to said field winding, an auxiliary driving armature, and field-exciting means for said auxiliary armatures adapted to temporarily produce, upon a fluctuation of distribution-circuit voltage, a more than proportionate change of main-field-winding excitation and an ensuing counter-effect as the auxiliary machines adjust themselves to the new voltage conditions.

12. In a system of control, the combination with a distribution circuit and a dynamo-electric machine having an armature and a field winding, of a resistor connected in series relation with the main armature and in parallel relation to the main field winding, an auxiliary driven armature for energizing said field winding and said resistor, an auxiliary driving armature winding provided with a shunt-excited field winding, and a field winding for said driven armature connected in series relation with said driving armature, whereby a sudden change of distribution-circuit voltage produces a relatively rapid and more than proportionate change of main field-winding excitation, and a more slowly-acting reversed effect to subsequently render the change of main field-winding excitation substantially proportional to the corresponding change of distribution-circuit voltage.

13. In a control system, the combination with a distribution circuit and a dynamo-electric machine having an armature and a field winding, of auxiliary means for producing an electromotive force to excite said field winding proportionately to the difference between the distribution-circuit voltage and the auxiliary electromotive force during stable operating conditions, said means being responsive to changes of said voltage for varying said electromotive force more slowly than the corresponding change.

14. In a control system, the combination with a distribution circuit and a dynamo-electric machine having an armature and a field winding, of an auxiliary source of counter-electromotive force normally dependent upon the distribution-circuit voltage for correspondingly influencing the excitation of said field winding, said source being responsive to fluctuations of said voltage for changing in value more slowly than the corresponding fluctuation.

In testimony whereof, I have hereunto subscribed my name this 24th day of August 1916.

RUDOLF E. HELLMUND.